United States Patent
Maeda et al.

(10) Patent No.: US 10,862,128 B2
(45) Date of Patent: Dec. 8, 2020

(54) BINDER COMPOSITION FOR SOLID ELECTROLYTE BATTERY

(71) Applicant: ZEON CORPORATION, Tokyo (JP)

(72) Inventors: Kouichirou Maeda, Tokyo (JP); Hiroki Oguro, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 131 days.

(21) Appl. No.: 16/308,048

(22) PCT Filed: Jul. 5, 2017

(86) PCT No.: PCT/JP2017/024711
§ 371 (c)(1),
(2) Date: Dec. 7, 2018

(87) PCT Pub. No.: WO2018/012380
PCT Pub. Date: Jan. 18, 2018

(65) Prior Publication Data
US 2019/0312278 A1 Oct. 10, 2019

(30) Foreign Application Priority Data

Jul. 12, 2016 (JP) .................................. 2016-137639

(51) Int. Cl.
*H01M 4/62* (2006.01)
*H01M 10/0562* (2010.01)

(52) U.S. Cl.
CPC ............. *H01M 4/622* (2013.01); *H01M 4/62* (2013.01); *H01M 10/0562* (2013.01)

(58) Field of Classification Search
CPC ....... H01M 4/62; H01M 4/66; H01M 10/0562
See application file for complete search history.

(56) References Cited

U.S. PATENT DOCUMENTS

| 2003/0113626 | A1* | 6/2003 | Maeda | ................. H01M 4/622 |
| | | | | 429/217 |
| 2014/0127579 | A1 | 5/2014 | Yoshida et al. | |
| 2016/0156038 | A1 | 6/2016 | Park et al. | |
| 2016/0365604 | A1* | 12/2016 | Mimura | ................. C08F 265/06 |

FOREIGN PATENT DOCUMENTS

| JP | S59151770 A | 8/1984 | |
| JP | 4134617 B2 | 8/2008 | |
| JP | 2009176484 A | 8/2009 | |
| JP | 2009211950 A | 9/2009 | |
| JP | 2014227473 A | 12/2014 | |
| JP | 2015115294 A | 6/2015 | |
| WO | 2012173089 A1 | 12/2012 | |
| WO | WO-2015129704 A1 * | 9/2015 | ............ C08F 265/06 |

OTHER PUBLICATIONS https://aralditematerials.com/wp-content/uploads/2018/06/Araldite-MY-721_US_e_New.pdf (Year: 2015).*
The Chemical Society of Japan, "Polymer Synthesis", Encyclopedia of Experimental Chemistry, May 6, 1992, pp. 48-51, vol. 28, Fourth Edition, Maruzen.
Sep. 26, 2017, International Search Report issued in the International Patent Application No. PCT/JP2017/024711.
Jan. 15, 2019, International Preliminary Report on Patentability issued in the International Patent Application No. PCT/JP2017/024711.
Jan. 3, 2020, the Extended European Search Report issued by the European Patent Office in the corresponding European Patent Application No. 17827508.7.

* cited by examiner

*Primary Examiner* — Gregg Cantelmo
(74) *Attorney, Agent, or Firm* — Kenja IP Law PC

(57) ABSTRACT

Provided is a binder composition for a solid electrolyte battery having excellent processability in solid electrolyte battery production and with which a solid electrolyte battery having excellent battery performance can be obtained. The binder composition for a solid electrolyte battery contains a particulate polymer having a core-shell structure and an organic solvent. A mass ratio of content of a polymer forming a core portion of the particulate polymer relative to content of a polymer forming a shell portion of the particulate polymer (i.e., a ratio of "polymer forming core portion/polymer forming shell portion") is 1/0.3 to 1/5.

6 Claims, No Drawings

BINDER COMPOSITION FOR SOLID ELECTROLYTE BATTERY

TECHNICAL FIELD

The present disclosure relates to a binder composition for a solid electrolyte battery that can be used in production of a solid electrolyte battery.

BACKGROUND

Demand for secondary batteries such as lithium ion batteries has been increasing in recent years for various applications such as mobile information terminals, mobile electronic devices, and other mobile terminals, and also domestic small power storage devices, electric motorcycles, electric vehicles, and hybrid electric vehicles.

The widespread use of batteries in such applications has been accompanied by demand for further improvement of secondary battery safety. Examples of effective methods for ensuring safety include prevention of liquid leakage and adoption of a solid electrolyte in place of a flammable organic solvent electrolyte.

Examples of known solid electrolytes include polymeric solid electrolytes in which polyethylene oxide and the like are used (for example, refer to PTL 1). However, polymeric solid electrolytes are flammable materials. Inorganic solid electrolytes formed from inorganic materials have also been proposed as solid electrolytes (for example, refer to PTL 2). Compared to polymeric solid electrolytes, inorganic solid electrolytes are solid electrolytes that are formed from inorganic materials and are non-flammable substances. Moreover, inorganic solid electrolytes are extremely safe compared to typically used organic solvent electrolytes. As described in PTL 2, high-safety solid electrolyte secondary batteries in which inorganic solid electrolytes are used are being developed.

Such solid electrolyte secondary batteries include an inorganic solid electrolyte layer as a solid electrolyte layer disposed between a positive electrode and a negative electrode. PTL 3 and PTL 4 describe all-solid-state lithium secondary batteries in which a solid electrolyte layer is formed by a method (application method) in which a slurry composition for a solid electrolyte layer that contains solid electrolyte particles and a solvent is applied onto a positive electrode active material layer of a positive electrode or a negative electrode active material layer of a negative electrode, and is then dried. When an electrode active material layer or solid electrolyte layer is to be formed by an application method, it is necessary for viscosity and fluidity of a slurry composition that contains an electrode active material or solid electrolyte to be within ranges that enable application. Moreover, in electrode active material layers and solid electrolyte layers obtained through application of a slurry composition and subsequent drying of solvent, additives other than the electrode active material or solid electrolyte, such as a binder, are important for expression of characteristics as a battery. For example, PTL 5 describes the use of a conjugated diene polymer as a binder and that in use of this conjugated diene polymer, the conjugated diene polymer is dissolved in a xylene solution and then used in a slurry composition.

CITATION LIST

Patent Literature

PTL 1: JP 4134617 B
PTL 2: JP S59-151770 A
PTL 3: JP 2009-176484 A
PTL 4: JP 2009-211950 A
PTL 5: JP 2015-115294 A

SUMMARY

Technical Problem

According to studies carried out by the inventors, all-solid-state lithium secondary batteries described in PTL 3 and 4 may have inadequate capacity characteristics due to insufficient ion conductivity within a solid electrolyte layer or within an electrode active material layer.

Moreover, when the inorganic solid electrolyte $Li_2S$ is used as a solid electrolyte and a conjugated diene polymer is used as a binder as in PTL 5, flexibility of an electrode active material layer or solid electrolyte layer deteriorates due to sulfide ions produced in a slurry composition reacting with double bonds in the conjugated diene polymer to cause crosslinking. Consequently, an electrode active material layer or solid electrolyte layer formed using the slurry composition of PTL 5 has poor processability because, for example, it is necessary to carefully handle the layer during production of a solid electrolyte battery.

In production of a solid electrolyte battery, there are cases in which pressing is performed in a step after application and drying of a slurry composition. However, when pressing has been performed in a situation in which only a conjugated diene polymer is used as a binder, there have been instances in which it has not been possible to suppress an increase in resistance of the obtained solid electrolyte battery due to roughening of the surface of the electrode active material layer or solid electrolyte layer. This has been a concern because battery performance in terms of capacity characteristics and the like may deteriorate.

An objective of the present disclosure is to provide a binder composition for a solid electrolyte battery having excellent processability in solid electrolyte battery production and with which a solid electrolyte battery having excellent battery performance can be obtained.

Solution to Problem

The inventors discovered through diligent investigation that the objective set forth above can be achieved through use of a particulate polymer having a specific core-shell structure. In this manner, the inventors completed the present disclosure.

Specifically, the present disclosure provides the following.

(1) A binder composition for a solid electrolyte battery comprising: a particulate polymer having a core-shell structure; and an organic solvent, wherein a mass ratio of content of a polymer forming a core portion of the particulate polymer relative to content of a polymer forming a shell portion of the particulate polymer (i.e., a ratio "polymer forming core portion/polymer forming shell portion") is 1/0.3 to 1/5.

(2) The binder composition for a solid electrolyte battery according to the foregoing (1), wherein the polymer forming the core portion has a glass-transition temperature of −50° C. or lower and includes a carbon-carbon double bond.

(3) The binder composition for a solid electrolyte battery according to the foregoing (1) or (2), wherein the polymer forming the shell portion has a carbon-carbon double bond content, calculated in terms of amount of double-bonded carbon, of 20 mass % or less and has a glass-transition temperature of higher than −50° C.

(4) The binder composition for a solid electrolyte battery according to any one of the foregoing (1) to (3), wherein the organic solvent has a boiling point of 100° C. or higher.

Advantageous Effect

According to the present disclosure, it is possible to provide a binder composition for a solid electrolyte battery having excellent processability in solid electrolyte battery production and with which a solid electrolyte battery having excellent battery performance can be obtained.

DETAILED DESCRIPTION

The following describes a presently disclosed binder composition for a solid electrolyte battery. The presently disclosed binder composition for a solid electrolyte battery is a binder composition for a solid electrolyte battery containing a particulate polymer having a core-shell structure and an organic solvent, and in which a mass ratio of content of a polymer forming a core portion of the particulate polymer relative to content of a polymer forming a shell portion of the particulate polymer (i.e., a ratio "polymer forming core portion/polymer forming shell portion") is 1/0.3 to 1/5.

The presently disclosed binder composition for a solid electrolyte battery is used for at least one of a positive electrode active material layer, a negative electrode active material layer, and a solid electrolyte layer. Note that a positive electrode includes a positive electrode active material layer on a current collector, whereas a negative electrode includes a negative electrode active material layer on a current collector. Moreover, the term "electrode active material layer" is used as a general term for a positive electrode active material layer and a negative electrode active material layer in the following description.

(Particulate Polymer)

The particulate polymer used in the present disclosure has a core-shell structure, wherein a mass ratio of content of a polymer forming a core portion relative to content of a polymer forming a shell portion (polymer forming core portion/polymer forming shell portion) is not more than 1/0.3 and not less than 1/5, is preferably 1/0.5 or less, and more preferably 1/0.7 or less, and is preferably 1/3 or more, and more preferably 1/2.5 or more. Peel strength of a solid electrolyte layer or electrode active material layer obtained using the particulate polymer decreases if the content of the polymer forming the core portion is too high. Moreover, stability of a slurry composition used in formation of a solid electrolyte layer or electrode active material layer deteriorates if the content of the polymer forming the core portion is too low.

In the particulate polymer having a core-shell structure that is used in the present disclosure, the polymer forming the shell portion is substantially partially disposed at the outside of a particle containing the polymer forming the core portion. Herein, "substantially partially disposed" means that the particle containing the polymer forming the core portion is not completely covered by the polymer forming the shell portion and that the polymer forming the core portion and the polymer forming the shell portion are both in an exposed state at the particle surface. Examples of structures such as described above include a snowman structure that, with respect to a spherical particle having a core-shell structure including a core portion and a shell portion that are formed from different polymers, is a structure in which some of the core portion is exposed at the shell portion; and an octopus ocellatus structure in which particles of a different type (polymer forming shell portion) are embedded in the surface of a spherical particle (particle forming core portion) to yield an integrated structure. Moreover, the particulate polymer may be a particulate polymer in which two or more heterophase structures such as described above are further combined to form a single composite particle.

(Core Portion)

The polymer forming the core portion is preferably a polymer that has a glass-transition temperature of −50° C. or lower and includes a carbon-carbon double bond. This polymer is preferably a conjugated diene polymer obtained through polymerization or copolymerization of a diene monomer, but is not specifically limited thereto.

Although no specific limitations are placed on the conjugated diene polymer other than being a polymer that includes a conjugated diene monomer unit obtained through polymerization of a diene monomer, the conjugated diene polymer may suitably be one or more selected from the group consisting of a conjugated diene homopolymer and a conjugated diene copolymer.

The conjugated diene homopolymer may be any polymer obtained through polymerization of only a diene monomer. Conjugated diene homopolymers that are typically used in industry may be used without any specific limitations. Examples of diene monomers that may be used to form a conjugated diene monomer unit of the conjugated diene homopolymer include 1,3-butadiene, isoprene, 2,3-dimethyl-1,3-butadiene, 1,3-pentadiene, 1,3-hexadiene, chloroprene, and cyanobutadiene. Of these diene monomers, 1,3-butadiene and isoprene are preferable, and 1,3-butadiene is more preferable. These diene monomers may be used individually or as a combination of two or more types.

Specific examples of conjugated diene homopolymers include polybutadiene, polyisoprene, polychloroprene, polycyanobutadiene, and polypentadiene. Of these conjugated diene homopolymers, polybutadiene and polyisoprene are preferable, and polybutadiene is more preferable. The mode of polymerization of the conjugated diene homopolymer is not specifically limited and may be selected as appropriate depending on the objective of use. Moreover, the method by which the conjugated diene homopolymer is produced may be any commonly known method without any specific limitations.

No specific limitations are placed on the conjugated diene copolymer other than being a copolymer that includes at least a conjugated diene monomer unit. Examples of diene monomers that may be used to form a conjugated diene monomer unit of the conjugated diene copolymer include the same diene monomers as can be used for the previously described conjugated diene homopolymer.

No specific limitations are placed on monomers that may be used to form monomer units other than the conjugated diene monomer unit in the conjugated diene copolymer other than being monomers that are copolymerizable with diene monomers, and examples thereof include cyano group-containing vinyl monomers, amino group-containing vinyl monomers, pyridyl group-containing vinyl monomers, alkoxyl group-containing vinyl monomers, and aromatic vinyl monomers. Of these monomers, cyano group-containing vinyl monomers and aromatic vinyl monomers are preferable, and aromatic vinyl monomers are more preferable. These monomers that are copolymerizable with diene monomers may be used individually or as a combination of two or more types.

Examples of aromatic vinyl monomers include styrene, α-methyl styrene, 2-methyl styrene, 3-methylstyrene, 4-methyl styrene, 2,4-diisopropylstyrene, 2,4-dimethyl styrene, 4-t-butylstyrene, 5-t-butyl-2-methyl styrene, N,N-dimethylaminoethyl styrene, and N,N-diethylaminoethylstyrene. Of these aromatic vinyl monomers, styrene and α-methylstyrene are particularly preferable. These aromatic vinyl monomers may be used individually or as a combination of two or more types.

Examples of cyano group-containing vinyl monomers include acrylonitrile and methacrylonitrile.

The proportions constituted by the conjugated diene monomer unit and monomer units other than the conjugated diene monomer unit (units of copolymerizable monomers) in the conjugated diene copolymer may be selected as appropriate depending on the objective of use. A mass ratio of "conjugated diene monomer units/units of copolymerizable monomers" is preferably 70/30 or more, and more preferably 80/20 or more. Note that the proportion constituted by the conjugated diene monomer unit in the conjugated diene copolymer is normally less than 100 mass %.

The conjugated diene homopolymer and conjugated diene copolymer described above may each be used individually or as a combination of two or more types as the conjugated diene polymer. Moreover, a conjugated diene homopolymer and a conjugated diene copolymer may be used in combination as the conjugated diene polymer.

The glass-transition temperature (Tg) of the polymer forming the core portion is preferably −50° C. or lower. When the glass-transition temperature of the polymer forming the core portion is within the range set forth above, it is possible to inhibit a phenomenon in which adhesiveness of the core portion is insufficient due to the polymer forming the core portion having an excessively high glass-transition temperature.

(Shell Portion)

The polymer forming the shell portion is preferably a polymer that has a carbon-carbon double bond content, calculated in terms of amount of double-bonded carbon, of 20 mass % or less and a glass-transition temperature of higher than −50° C. This polymer is preferably an acrylate polymer obtained through polymerization or copolymerization of a (meth)acrylate monomer, but is not specifically limited thereto. In the present disclosure, "(meth)acrylate" is used to indicate acrylate or methacrylate.

Examples of (meth)acrylate monomers include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, and 2-ethylhexyl acrylate; acrylic acid alkoxy esters such as 2-methoxyethyl acrylate and 2-ethoxyethyl acrylate; 2-(perfluoroalkyl) ethyl acrylates such as 2-(perfluorobutyl)ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, and 2-ethylhexyl methacrylate; methacrylic acid alkoxy esters such as 2-methoxyethyl methacrylate and 2-ethoxyethyl methacrylate; 2-(perfluoroalkyl)ethyl methacrylates such as 2-(perfluorobutyl)ethyl methacrylate and 2-(perfluoropentyl)ethyl methacrylate; benzyl acrylate; and benzyl methacrylate. Of these (meth)acrylate monomers, it is particularly preferable that at least one of ethyl acrylate, n-butyl acrylate, and t-butyl acrylate is included. One (meth)acrylate monomer may be used individually, or two or more (meth)acrylate monomers may be used in combination in a freely selected ratio.

The percentage content of a monomer unit derived from the (meth)acrylate monomer in the polymer forming the shell portion is preferably 50 mass % to 100 mass %, and more preferably 60 mass % to 100 mass %.

Examples of monomers that are copolymerizable with the (meth)acrylate monomer in a case in which the (meth) acrylate monomer is copolymerized include unsaturated carboxylic acids such as acrylic acid, methacrylic acid, itaconic acid, and fumaric acid; carboxylic acid esters including two or more carbon-carbon double bonds such as ethylene glycol dimethacrylate, diethylene glycol dimethacrylate, and trimethylolpropane triacrylate; aromatic vinyl monomers such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene; amide monomers such as acrylamide, N-methylolacrylamide, and acrylamido-2-methylpropane sulfonic acid; α,β-unsaturated nitrile compounds such as acrylonitrile and methacrylonitrile; olefins such as ethylene and propylene; diene monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocycle-containing vinyl compounds such as N-vinylpyrrolidone, vinylpyridine, and vinylimidazole; and glycidyl group-containing monomers such as glycidyl acrylate, glycidyl methacrylate, and allyl glycidyl ether. Moreover, a plurality of such copolymerizable monomers may be used together.

The carbon-carbon double bond content of the polymer forming the shell portion, calculated in terms of the amount of double-bonded carbon, is preferably 20 mass % or less, more preferably 5 mass % or less, and even more preferably 0 mass % (i.e., carbon-carbon double bonds are not included). When the carbon-carbon double bond content of the polymer forming the shell portion is within any of the ranges set forth above, it is possible to inhibit a phenomenon in which, as a consequence of the carbon-carbon double bond content being excessively high, sulfide ions produced in a slurry composition used in formation of a solid electrolyte layer or electrode active material layer react with the particulate polymer to cause crosslinking. As a result, the obtained solid electrolyte layer or electrode active material layer can be provided with sufficient flexibility.

The glass-transition temperature (Tg) of the polymer forming the shell portion is preferably higher than −50° C., and more preferably −40° C. or higher. When the glass-transition temperature of the polymer forming the shell portion is within any of the ranges set forth above, it is possible to inhibit a phenomenon in which the particulate polymer readily produces aggregates of mutually adhered particles when used in a binder composition as a result of the glass-transition temperature of the shell portion being too low.

(Production of Particulate Polymer)

The particulate polymer having a core-shell structure can be obtained by (co)polymerizing monomer from which the polymer forming the shell portion is derived in the presence of the polymer forming the core portion. The method by which monomer from which the polymer forming the shell portion is derived is (co)polymerized in the presence of the polymer forming the core portion is not specifically limited and may, for example, be a method in which emulsion polymerization of monomer from which the polymer forming the shell portion is derived is carried out in an aqueous dispersion of particles containing the polymer forming the core portion. As a result, a particulate polymer in which the polymer forming the shell portion is substantially partially disposed at the outside of particles containing the polymer forming the core portion can be obtained. Note that "(co)polymerization" is used to indicate "polymerization" or "copolymerization". The polymer forming the core portion that is used in production of the particulate polymer may be formed by seeded polymerization. In such a situation, the seed portion is not included in the "content of the polymer forming the core portion" described above. The polymerization process may be a batch process, a semi-continuous process, or a continuous process. Moreover, commonly known conditions may be adopted for the polymerization pressure, the polymerization temperature, and the polymerization time without any specific limitations.

The emulsion polymerization is normally carried out by a standard method. For example, the emulsion polymerization may be carried out by a method described in Vol. 28 of "Encyclopedia of Experimental Chemistry" (published by Maruzen; edited by The Chemical Society of Japan). Specifically, this is a method in which water, additives such as a dispersant, an emulsifier, and a crosslinking agent, a polymerization initiator, and a monomer solution are added into a sealed vessel equipped with a stirrer and a heating device such as to have a specific composition, the monomer composition in the vessel is stirred to emulsify monomers and the like in the water, and the temperature is increased under stirring to initiate polymerization, or a method in which the monomer composition is added into the sealed vessel after emulsification and then a reaction is initiated in the same manner. In the emulsion polymerization, various additives such as surfactants, polymerization initiators, chain transfer agents, chelating agents, electrolytes, and oxygen scavengers that are typically used in emulsion polymerization reactions may be used as auxiliary materials for polymerization.

The surfactant used in emulsion polymerization may be any surfactant with which the desired particles can be obtained. Examples of surfactants that may be used include sodium dodecylbenzenesulfonate, sodium lauryl sulfate, sodium dodecyl diphenyl ether disulfonate, and sodium dialkyl sulfosuccinate. One surfactant may be used individually, or two or more surfactants may be used in combination in a freely selected ratio.

The amount of the surfactant may be any amount so long as the desired particles can be obtained but, relative to 100 parts by mass, in total, of monomer from which the polymer forming the shell portion is derived, is preferably 0.5 parts by mass or more, and more preferably 1 part by mass or more, and is preferably 10 parts by mass or less, and more preferably 5 parts by mass or less.

A polymerization initiator is normally used in the polymerization reaction. The polymerization initiator may be any polymerization initiator with which the desired particles can be obtained. Examples of polymerization initiators that may be used include sodium persulfate (NaPS), ammonium persulfate (APS), and potassium persulfate (KPS). Of these polymerization initiators, sodium persulfate and ammonium persulfate are preferable, and ammonium persulfate is more preferable. Deterioration of cycle characteristics of an obtained lithium ion secondary battery can be suppressed through use of ammonium persulfate or sodium persulfate as the polymerization initiator.

Moreover, a molecular weight modifier or chain transfer agent may be included in the polymerization system during polymerization. Examples of molecular weight modifiers and chain transfer agents that may be used include alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide and diisopropyl xanthogen disulfide; terpinolene; thiuram compounds such as tetramethylthiuram disulfide, tetraethylthiuram disulfide, and tetramethylthiuram monosulfide; phenolic compounds such as 2,6-di-t-butyl-4-methylphenol and styrenated phenol; allyl compounds such as allyl alcohol; halogenated hydrocarbon compounds such as dichloromethane, dibromomethane, and carbon tetrabromide; thioglycolic acid; thiomalic acid; 2-ethylhexyl thioglycolate; diphenylethylene; and x-methylstyrene dimer. One of these molecular weight modifiers and chain transfer agents may be used individually, or two or more of these molecular weight modifiers and chain transfer agents may be used in combination in a freely selected ratio.

(Binder Composition for Solid Electrolyte Battery)

The presently disclosed binder composition for a solid electrolyte battery contains the above-described particulate polymer having a core-shell structure and an organic solvent.

In a case in which the particulate polymer is obtained as an aqueous dispersion, it is preferable that solvent exchange with an organic solvent is carried out. The solvent of the aqueous dispersion is an aqueous solvent such as water. The solvent exchange can be carried out by a commonly known method. For example, the aqueous dispersion and an organic solvent may be loaded into a rotary evaporator, and an operation of solvent exchange and dehydration may be performed under reduced pressure at a specific temperature.

The solid content concentration of the binder composition for a solid electrolyte battery used in the present disclosure is preferably at least 1 mass % and not more than 40 mass %. Moreover, the water content in the particulate polymer-containing organic solvent after solvent exchange is preferably less than 1,000 ppm, more preferably less than 500 ppm, and even more preferably less than 100 ppm.

(Organic Solvent)

The organic solvent used in the present disclosure is preferably an organic solvent having a boiling point of 100° C. or higher. The organic solvent having a boiling point of 100° C. or higher is preferably an aromatic hydrocarbon such as toluene or xylene; an ether such as cyclopentyl methyl ether; or an ester such as butyl acetate, and is more preferably xylene. These solvents may be used individually or as a mixture of two or more types.

Moreover, it is preferable that any of the examples of organic solvents listed above is used in solvent exchange.

(Solid Electrolyte Battery)

By using the presently disclosed binder composition for a solid electrolyte battery to form at least one layer out of a positive electrode active material layer, a negative electrode active material layer, and a solid electrolyte layer, and preferably to form all of these layers, a solid electrolyte battery that includes a positive electrode including a positive electrode active material layer, a negative electrode including a negative electrode active material layer, and a solid electrolyte layer disposed between the positive and negative electrode active material layers can be obtained. Note that the positive electrode includes the positive electrode active material layer on a current collector, whereas the negative electrode includes the negative electrode active material layer on a current collector. The following describes the solid electrolyte layer, the positive electrode active material layer, and the negative electrode active material layer.

(Solid Electrolyte Layer)

The solid electrolyte layer is formed by applying a slurry composition for a solid electrolyte layer containing solid electrolyte particles and a binder for a solid electrolyte layer onto the subsequently described positive electrode active material layer or negative electrode active material layer, and then drying the slurry composition. The slurry composition for a solid electrolyte layer is produced by mixing the solid electrolyte particles, the binder for a solid electrolyte layer, an organic solvent, and other components that are added as necessary. The organic solvent may be any of the examples of organic solvents previously described in relation to the binder composition for a solid electrolyte battery.

(Solid Electrolyte Particles)

The solid electrolyte is normally in a particulate form as a result of having undergone pulverization, and has an indeterminate shape rather than a completely spherical shape. The size of fine particles is normally measured by a method in which the particles are irradiated with laser light and then scattered light is measured, for example. In this situation, the particle diameter is a value that presumes that the shape of a single particle is spherical. When multiple particles are measured together, the proportion of particles having a certain particle diameter can be expressed as a particle size distribution.

The average particle diameter of the solid electrolyte particles is preferably at least 0.3 μm and not more than 1.3 μm from a viewpoint that a slurry composition for a solid electrolyte layer having good dispersibility and coatability can be obtained. Note that the average particle diameter of the solid electrolyte particles is the number average particle diameter, which can be determined through measurement of a particle size distribution by laser diffraction.

No specific limitations are placed on the solid electrolyte particles other than being particles that are conductive with respect to lithium ions. The solid electrolyte particles preferably include a crystalline inorganic lithium ion conductor or an amorphous inorganic lithium ion conductor.

Examples of crystalline inorganic lithium ion conductors include $Li_3N$, LISICON ($Li_{14}Zn(GeO_4)_4$), perovskite-type $Li_{0.5}La_{0.5}TiO_3$, LIPON ($Li_{3+y}PO_{4-x}N_x$), and Thio-LISICON ($Li_{3.25}Ge_{0.25}P_{0.75}S_4$).

No specific limitations are placed on the amorphous inorganic lithium ion conductor so long as it contains S (sulfur atom) and exhibits ion conductivity (i.e., a sulfide solid electrolyte material). In a case in which the solid electrolyte battery in which the presently disclosed binder composition for a solid electrolyte battery is to be used is an all-solid-state lithium secondary battery, a material obtained using a raw material composition containing $Li_2S$ and a sulfide of an element belonging to any of groups 13 to 15 may be used as the sulfide solid electrolyte material. The method by which the sulfide solid electrolyte material is synthesized using such a raw material composition may be an amorphization method, for example. Examples of amorphization methods that may be used include mechanical milling and melt quenching, of which, mechanical milling is preferable. This is because mechanical milling enables processing at normal temperature and simplification of the production process.

The element belonging to any of groups 13 to 15 may be Al, Si, Ge, P, As, Sb, or the like. Specific examples of sulfides of elements belonging to groups 13 to 15 include $Al_2S_3$, $SiS_2$, $GeS_2$, $P_2S_3$, $P_2S_5$, $As_2S_3$, and $Sb_2S_3$. Of these sulfides, the use of a sulfide of an element belonging to group 14 or 15 is preferable. In particular, the sulfide solid electrolyte material obtained using a raw material composition containing $Li_2S$ and a sulfide of an element belonging to any of groups 13 to 15 is preferably a $Li_2S$—$P_2S_5$ material, a $Li_2S$—$SiS_2$ material, a $Li_2S$—$GeS_2$ material, or a $Li_2S$—$Al_2S_3$ material, and is more preferably a $Li_2S$—$P_2S_5$ material. This is because these materials have excellent Li ion conductivity.

Moreover, the sulfide solid electrolyte material preferably includes bridging sulfur. The inclusion of bridging sulfur increases ion conductivity. When a sulfide solid electrolyte material includes bridging sulfur, reactivity with a positive electrode active material is normally high, and a high-resistance layer is more readily formed. However, as a result of the binder composition containing the particulate polymer having a core-shell structure being used in the present disclosure, an effect of the present disclosure with regard to inhibiting high-resistance layer formation can be sufficiently displayed. The inclusion of bridging sulfur can be judged by considering, for example, measurement results of a Raman spectrum, the chemical composition ratio of raw material, measurement results of NMR, and the like.

The molar fraction of $Li_2S$ in a $Li_2S$—$P_2S_5$ material or a $Li_2S$—$Al_2S_3$ material is, for example, within a range of 50 mol % to 74 mol %, and preferably within a range of 60 mol % to 74 mol % from a viewpoint of more reliably obtaining a sulfide solid electrolyte material including bridging sulfur.

Moreover, the sulfide solid electrolyte material may be sulfide glass, or may be crystallized sulfide glass obtained through heat treatment of this sulfide glass. The sulfide glass can be obtained, for example, by the previously described amorphization methods. The crystallized sulfide glass can be obtained, for example, by subjecting sulfide glass to heat treatment.

In particular, the sulfide solid electrolyte material is preferably crystallized sulfide glass represented by $Li_7P_3S_{11}$. This is because this crystallized sulfide glass has particularly good Li ion conductivity. $Li_7P_3S_{11}$ can be synthesized by, for example, mixing $Li_2S$ and $P_2S_5$ in a molar ratio of 70:30, performing amorphization using a ball mill to synthesize sulfide glass, and subjecting the obtained sulfide glass to heat treatment at a temperature of 150° C. to 360° C. to synthesize the $Li_7P_3S_{11}$.

(Binder for Solid Electrolyte Layer)

The binder for a solid electrolyte layer is used in order to bind the solid electrolyte particles and form a solid electrolyte layer. It is preferable that the presently disclosed binder composition for a solid electrolyte battery is used as the binder for a solid electrolyte layer. Through use of the presently disclosed binder composition for a solid electrolyte battery, it is possible to inhibit a phenomenon in which sulfide ions generated in the slurry composition for a solid electrolyte layer react with the particulate polymer to cause crosslinking. Consequently, the obtained solid electrolyte layer can be provided with sufficient flexibility.

(Positive Electrode Active Material Layer)

The positive electrode active material layer is formed by applying a slurry composition for a positive electrode active material layer containing a positive electrode active material, solid electrolyte particles, and a binder for a positive electrode onto the surface of a subsequently described current collector, and then drying the slurry composition. The slurry composition for a positive electrode active material layer is produced by mixing the positive electrode active material, the solid electrolyte particles, the binder for a positive electrode, an organic solvent, and other components that are added as necessary.

(Positive Electrode Active Material)

The positive electrode active material is a compound that can store and release lithium ions. Positive electrode active materials are broadly categorized as positive electrode active materials composed of inorganic compounds and positive electrode active materials composed of organic compounds.

Examples of positive electrode active materials composed of inorganic compounds include transition metal oxides, composite oxides of lithium and transition metals, and transition metal sulfides. The transition metal may be Fe, Co, Ni, Mn, or the like. Specific examples of inorganic compounds that may be used in the positive electrode active material include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

Examples of positive electrode active materials composed of organic compounds include polyaniline, polypyrrole, polyacenes, disulfide compounds, polysulfide compounds, and N-fluoropyridinium salts. The positive electrode active material may be a mixture of an inorganic compound and an organic compound such as described above.

The average particle diameter of the positive electrode active material used in the present disclosure is normally at least 0.1 μm and not more than 50 μm, and preferably at least 1 μm and not more than 20 μm from a viewpoint of improving battery characteristics such as load characteristics and charge/discharge cycle characteristics, and from a viewpoint that a solid electrolyte secondary battery having high charge/discharge capacity can be obtained, and handling of the slurry composition for a positive electrode active material layer and handling during positive electrode production are easy. Note that the average particle diameter of the positive electrode active material is the number average particle diameter, which can be determined through measurement of a particle size distribution by laser diffraction.

(Solid Electrolyte Particles)

The solid electrolyte particles may be any of the solid electrolyte particles listed as examples in relation to the solid electrolyte layer.

The mass ratio of the positive electrode active material and the solid electrolyte particles (positive electrode active material:solid electrolyte particles) is preferably 90:10 to 50:50, and more preferably 60:40 to 80:20. When the mass ratio of the positive electrode active material is within any of the ranges set forth above, it is possible to inhibit a phenomenon of battery capacity decreasing as a result of the amount of positive electrode active material in the battery decreasing due to the mass ratio of the positive electrode active material being too small. Moreover, it is possible to inhibit a phenomenon of battery capacity decreasing as a result of electrical conductivity being insufficient and the positive electrode active material not being effectively used due to the mass ratio of the solid electrolyte particles being too small.

(Binder for Positive Electrode)

The binder for a positive electrode is used in order to bind the positive electrode active material and the solid electrolyte particles and form a positive electrode active material layer. It is preferable that the presently disclosed binder composition for a solid electrolyte battery is used as the binder for a positive electrode. Through use of the presently disclosed binder composition for a solid electrolyte battery, it is possible to inhibit a phenomenon in which sulfide ions generated in the slurry composition for a positive electrode active material layer react with the particulate polymer to cause crosslinking. Consequently, the obtained positive electrode active material layer can be provided with sufficient flexibility.

From a viewpoint of preventing detachment of the positive electrode active material from an electrode without impairing battery reactions, the content of the binder for a positive electrode in the slurry composition for a positive electrode active material layer in terms of solid content per 100 parts by mass of the positive electrode active material is preferably 0.1 parts by mass or more, and more preferably 0.2 parts by mass or more, and is preferably 5 parts by mass or less, and more preferably 4 parts by mass or less.

The organic solvent in the slurry composition for a positive electrode active material layer may be any of the examples of organic solvents previously described in relation to the binder composition for a solid electrolyte battery. From a viewpoint of obtaining good coating characteristics while maintaining dispersibility of the solid electrolyte, the content of the organic solvent in the slurry composition for a positive electrode active material layer per 100 parts by mass of the positive electrode active material is preferably 20 parts by mass or more, and more preferably 30 parts by mass or more, and is preferably 80 parts by mass or less, and more preferably 70 parts by mass or less.

Examples of components other than those described above that may be added to the slurry composition for a positive electrode active material layer as necessary include additives exhibiting various functions such as conductive agents and reinforcing materials. No specific limitations are placed on these other components so long as they do not influence battery reactions.

(Conductive Agent)

The conductive agent may be any material that can impart electrical conductivity and typical examples thereof include carbon powder such as acetylene black, carbon black, and graphite, and fibers and foils of various metals.

(Reinforcing Material)

Various inorganic fillers and organic fillers having a spherical, plate-like, rod-like, or fibrous form can be used as reinforcing materials.

(Negative Electrode Active Material Layer)

The negative electrode active material layer contains a negative electrode active material.

(Negative Electrode Active Material)

Examples of negative electrode active materials that may be used include carbon allotropes such as graphite and coke. A negative electrode active material containing a carbon allotrope may be used in a mixed or coated form with a metal, a metal salt, an oxide, or the like. Other examples of negative electrode active materials that may be used include oxides of silicon, tin, zinc, manganese, iron, nickel, and the like, sulfuric acid salts, lithium metal, lithium alloys such as Li—Al, Li—Bi—Cd, and Li—Sn—Cd, lithium transition metal nitrides, and silicon. In the case of a metal material, the metal material may be used as an electrode in the form of a metal foil or metal plate, or may be used in a particulate form.

In a situation in which the negative electrode active material is in a particulate form, the negative electrode active material layer is formed by applying a slurry composition for a negative electrode active material layer containing the negative electrode active material, solid electrolyte particles, and a binder for a negative electrode onto the surface of a subsequently described current collector, and then drying the slurry composition. The slurry composition for a negative electrode active material layer can be produced by mixing the negative electrode active material, the solid electrolyte particles, the binder for a negative electrode, an organic solvent, and other components that are added as necessary.

In the case of a particulate negative electrode active material, the average particle diameter of the negative electrode active material is normally at least 1 µm and not more than 50 µm, and preferably at least 15 µm and not more than 30 µm from a viewpoint of improving battery characteristics such as initial efficiency, load characteristics, and charge/discharge cycle characteristics.

The mass ratio of the negative electrode active material and the solid electrolyte particles (negative electrode active material:solid electrolyte particles) is preferably 90:10 to 50:50, and more preferably 60:40 to 80:20. When the mass ratio of the negative electrode active material is within any of the ranges set forth above, it is possible to inhibit a phenomenon of battery capacity decreasing as a result of the amount of negative electrode active material in a battery decreasing due to the mass ratio of the negative electrode active material being too small. Moreover, it is possible to inhibit a phenomenon of battery capacity decreasing as a result of electrical conductivity being insufficient and the negative electrode active material not being effectively used due to the mass ratio of the solid electrolyte particles being too small.

(Binder for Negative Electrode)

The binder for a negative electrode is used in order to bind the negative electrode active material and the solid electrolyte particles and form a negative electrode active material layer. It is preferable that the presently disclosed binder composition for a solid electrolyte battery is used as the binder for a negative electrode. Through use of the presently disclosed binder composition for a solid electrolyte battery, it is possible to inhibit a phenomenon in which sulfide ions generated in the slurry composition for a negative electrode active material layer react with the particulate polymer to cause crosslinking. Consequently, the obtained negative electrode active material layer can be provided with sufficient flexibility.

In a situation in which the negative electrode active material is in a particulate form, the content of the binder for a negative electrode in the slurry composition for a negative electrode active material layer in terms of solid content per 100 parts by mass of the negative electrode active material is preferably 0.1 parts by mass or more, and more preferably 0.2 parts by mass or more, and is preferably 5 parts by mass or less, and more preferably 4 parts by mass or less from a viewpoint of preventing detachment of the negative electrode active material from an electrode without impairing battery reactions.

The solid electrolyte particles, organic solvent, and other components that are added as necessary in the slurry composition for a negative electrode active material layer may be any of those given as examples in relation to the positive electrode active material layer.

(Current Collector)

The current collector used in formation of the positive electrode active material layer or negative electrode active material layer may be any material that has electrical conductivity and electrochemical durability. However, the current collector is preferably a metal material such as iron, copper, aluminum, nickel, stainless steel, titanium, tantalum, gold, or platinum from a viewpoint of having heat resistance. Of these metal materials, aluminum is particularly preferable for a positive electrode and copper is particularly preferable for a negative electrode. Although no specific limitations are placed on the shape of the current collector, the current collector is preferably a sheet-shaped current collector having a thickness of approximately 0.001 mm to 0.5 mm. The current collector is preferably subjected to surface roughening treatment before use in order to increase adhesion strength with the positive/negative electrode active material layer set forth above. The method of surface roughening may, for example, be a mechanical polishing method, an electrolytic polishing method, or a chemical polishing method. The mechanical polishing is performed, for example, using a coated abrasive in which abrasive grains are bonded to cloth or paper, a whetstone, an emery wheel, or a wire brush including steel wire or the like. An intermediate layer may be formed on the surface of the current collector in order to increase electrical conductivity or adhesion strength of the current collector with the positive/negative electrode active material layer.

No specific limitations are placed on the method by which each of the above-described slurry compositions (slurry composition for solid electrolyte layer, slurry composition for positive electrode active material layer, and slurry composition for negative electrode active material layer) is mixed. For example, a method using a mixing apparatus such as a stirring-type apparatus, a shaking-type apparatus, or a rotary-type apparatus may be adopted. Moreover, examples include a method in which a dispersing and kneading apparatus such as a homogenizer, a ball mill, a bead mill, a planetary mixer, a sand mill, a roll mill, or a planetary kneader is used. A method in which a planetary mixer, a ball mill, or a bead mill is used is preferable from a viewpoint that this method can inhibit aggregation of the solid electrolyte particles.

(Production of Solid Electrolyte Battery)

The positive electrode of the solid electrolyte battery is obtained by forming a positive electrode active material layer on a current collector. The positive electrode active material layer is formed by applying the above-described slurry composition for a positive electrode active material layer onto a current collector, and then drying the slurry composition.

In a case in which a metal foil or a metal plate is used as a negative electrode active material, the metal foil or metal plate may be used as the negative electrode of the solid electrolyte battery in this form. On the other hand, in a case in which the negative electrode active material is in a particulate form, the negative electrode is obtained by forming a negative electrode active material layer on a separate current collector to the current collector of the positive electrode. The negative electrode active material layer is formed by applying the above-described slurry composition for a negative electrode active material layer onto a separate current collector to the current collector of the positive electrode, and then drying the slurry composition.

Next, a solid electrolyte layer is formed by applying the slurry composition for a solid electrolyte layer onto the positive electrode active material layer or negative electrode active material layer that has been formed, and then drying the slurry composition. The electrode on which the solid electrolyte layer is not formed and the electrode on which the solid electrolyte layer is formed are then laminated to produce a solid electrolyte battery device.

No specific limitations are placed on the method by which the slurry composition for a positive electrode active material layer and the slurry composition for a negative electrode active material layer are each applied onto a current collector, and this application may be carried out by, for example, doctor blading, dip coating, reverse roll coating, direct roll coating, gravure coating, extrusion coating, brush coating, or the like. Although no specific limitations are placed on the amount of slurry composition that is applied, the amount is normally set such that the thickness of the active material layer formed after removal of organic solvent is 5 μm to 300 μm, and preferably 10 μm to 250 μm. The drying method is not specifically limited and examples of drying methods that may be used include drying by warm, hot, or low-humidity air, drying in a vacuum, and drying through irradiation with (far) infrared radiation, an electron beam, or the like. The drying conditions are normally adjusted such that the organic solvent is volatilized as quickly as possible within a rate range for which cracks do not form in the electrode active material layer due to stress concentration and for which peeling of the electrode active material layer from the current collector does not occur. Moreover, an electrode obtained after drying may be pressed in order to stabilize the electrode. Examples of pressing methods that may be used include mold pressing and calender pressing, but these examples are not limiting. Through this pressing, the particulate polymer in the layer formed using the presently disclosed binder composition is squashed, and the polymer forming the core portion becomes sufficiently exposed at the surface of the particulate polymer. Consequently, close adherence of the particulate polymer can be sufficiently displayed.

The drying temperature is set as a temperature at which sufficient volatilization of the organic solvent occurs. Specifically, the drying temperature is preferably 50° C. to 250° C., and more preferably 80° C. to 200° C. from a viewpoint that a good active material layer can be formed without thermal decomposition of the binder for a positive electrode or the binder for a negative electrode. The drying time is normally within a range of 10 minutes to 60 minutes but is not specifically limited to this range.

No specific limitations are placed on the method by which the slurry composition for a solid electrolyte layer is applied onto the positive electrode active material layer or the negative electrode active material layer. The slurry composition for a solid electrolyte layer may be applied by any of the methods by which the slurry composition for a positive electrode active material layer and the slurry composition for a negative electrode active material layer can be applied onto a current collector. Of these methods, gravure coating is preferable from a viewpoint that this enables formation of the solid electrolyte layer as a thin film. Although no specific limitations are placed on the amount of slurry composition that is applied, the amount is normally set such that the thickness of the solid electrolyte layer formed after removal of organic solvent is 2 μm to 20 μm, and preferably 3 μm to 15 μm. The drying method, drying conditions, and drying temperature may be the same as those of the slurry composition for a positive electrode active material layer and the slurry composition for a negative electrode active material layer.

Moreover, a laminate obtained by laminating the electrode on which the solid electrolyte layer is formed and the electrode on which the solid electrolyte layer is not formed may be subjected to pressing. The method of pressing is not specifically limited and may be flat plate pressing, roll pressing, cold isostatic pressing (CIP), or the like. The pressing pressure is preferably 5 MPa to 700 MPa, and more preferably 7 MPa to 500 MPa from a viewpoint of lowering resistance at each interface between the electrodes and the solid electrolyte layer, lowering contact resistance between particles in each of the layers, and achieving good battery characteristics.

Through this pressing, the particulate polymer in the layer formed using the presently disclosed binder composition is squashed and the polymer forming the core portion becomes sufficiently exposed at the surface of the particulate polymer. Consequently, close adherence of the particulate polymer can be sufficiently displayed.

No specific limitations are placed on whether the slurry composition for a solid electrolyte layer is applied onto the positive electrode active material layer or the negative electrode active material layer.

The obtained solid electrolyte battery device is placed in a battery container either as obtained or after rolling, folding, or the like in accordance with the battery shape. The battery container is subsequently sealed to obtain a solid electrolyte battery. Moreover, an expanded metal, an overcurrent preventing device such as a fuse or a PTC device, a lead plate, or the like may be placed in the battery container in order to prevent pressure increase inside the battery and the occurrence of overcharging or overdischarging. The battery shape may be a coin type, a button type, a sheet type, a cylinder type, a prismatic type, a flat type, or the like.

EXAMPLES

The following describes the present disclosure through examples. However, the present disclosure is not in any way limited by these examples. Various characteristics were evaluated by the following methods. Note that "parts" and "%" in the examples refer to "parts by mass" and "mass %", respectively, unless otherwise specified.

Evaluations and measurements in the examples and comparative examples were carried out as follows.

<Glass-Transition Temperature>

A binder composition was dried for 1 hour at 80° C. and was then vacuum dried for 1 hour at 80° C. to obtain a specimen. Glass-transition temperature measurement was performed with respect to this specimen using a differential calorimeter (DSC 8230 produced by Rigaku Corporation) to determine the glass-transition temperature of each polymer. The results are shown in Table 1.

<Smoothness of Coating Surface>

A slurry composition for a solid electrolyte layer used in each example or comparative example was applied onto and dried on one surface of aluminum foil to form a solid electrolyte layer of 18 μm in thickness, and thereby obtain a specimen. The surface shape of the solid electrolyte layer of this specimen was measured in accordance with JIS B0601 (1994) using a laser microscope (VK-8710 produced by Keyence Corporation), and the arithmetic average roughness Ra was taken to be the pre-pressing coating surface smoothness.

The specimen was pressed such that the thickness of the solid electrolyte layer became 11 μm. The surface shape of the solid electrolyte layer of the post-pressing specimen was measured in accordance with JIS B0601 (1994) using a laser microscope (VK-8710 produced by Keyence Corporation), and the arithmetic average roughness Ra was taken to be the post-pressing coating surface smoothness. A smaller value for the post-pressing surface roughness Ra indicates that there will be better close adherence between an electrode and the solid electrolyte layer. The results are shown in Table 1.

<Flexibility of Solid Electrolyte Layer>

A slurry composition for a solid electrolyte layer used in each example or comparative example was applied onto and dried on one surface of aluminum foil to form a solid electrolyte layer, and thereby obtain a specimen. The surface of the specimen at which the solid electrolyte layer was not formed was positioned along a metal rod of 1.0 mm in diameter and was wound around the metal rod. The occurrence of splitting of the solid electrolyte layer was evaluated. An evaluation of "good" was given in a case in which splitting of the solid electrolyte layer did not occur and an evaluation of "poor" was given in a case in which splitting of the solid electrolyte layer occurred. The results are shown in Table 1. When splitting of the solid electrolyte layer is not observed, this indicates that the solid electrolyte layer has high flexibility and excellent processability.

<Measurement of Resistance>

The resistance of a solid electrolyte layer produced in each example or comparative example was determined by measurement using an impedance meter and calculation of resistance from a Nyquist plot. The results are shown in Table 1. A smaller value for the resistance indicates that a solid electrolyte battery having better battery performance is obtained.

<Battery Capacity>

A solid electrolyte battery produced in each example or comparative example was subjected to charge/discharge cycling of constant-current charging to 4.2 V and subsequent constant-voltage charging by a 0.5 C constant-current constant-voltage charging method at 25° C., followed by discharging to 3.0 V by a 0.5 C constant current at 25° C. Five charge/discharge cycles were performed. The discharge capacity of the fifth cycle is shown in Table 1 as the battery capacity. A larger value indicates better capacity characteristics.

Example 1

<Production of Particulate Polymer>
<Production of Core Portion>

An autoclave equipped with a stirrer was charged with 150 parts of deionized water, 100 parts of 1,3-butadiene, 0.2 parts of ethylene glycol dimethacrylate (hereinafter also referred to as "EGDMA") as a crosslinking agent, 0.5 parts of disproportionated rosin acid as an emulsifier, and 0.3 parts of potassium persulfate as a polymerization initiator, and polymerization was carried out for 60 hours at 60° C.

After a specific time had passed, the autoclave was cooled to room temperature. The conversion rate was calculated from the amount of residual polymer and the average particle diameter was measured. The conversion rate was 96% and the average particle diameter was 180 nm. Moreover, the glass-transition temperature (Tg) was −70° C. Residual monomer was removed from the reaction liquid under reduced pressure, and then the reaction liquid was adjusted to pH 7.5 with ammonia water.

<Production of Shell Portion>

Next, the solid content concentration of the reaction liquid was adjusted to 40% through addition of deionized water. A glass vessel equipped with a stirrer was charged with 250 parts (100 parts of solid content) of the resultant reaction liquid, and then 100 parts of n-butyl acrylate (hereinafter also referred to as "BA"), 0.5 parts of EGDMA as a crosslinking agent, 0.3 parts of sodium persulfate as a polymerization initiator, and 0.5 parts of disproportionated rosin acid as an emulsifier were added thereto. Polymerization was carried out for 5 hours at 80° C. Residual monomer was removed from the resultant reaction liquid under reduced pressure, and then the reaction liquid was adjusted to pH 7.5 with ammonia water. Next, the solid content concentration of the reaction liquid was adjusted to 40% through addition of deionized water to obtain a water dispersion of a particulate polymer having a core-shell structure. The conversion rate was 93% and the particle diameter was 210 nm. Moreover, the polymer forming the shell portion did not include carbon-carbon double bonds and had a glass-transition temperature (Tg) of −40° C.

<Production of Binder Composition>

In order to perform solvent exchange of the solvent of the particulate polymer from water to an organic solvent, 500 g of xylene was added to 100 g of the water dispersion of the particulate polymer that had undergone solid content concentration adjustment, and then water was evaporated under reduced pressure. In this manner, a binder composition containing the particulate polymer and xylene as an organic solvent was obtained.

<Production of Slurry Composition for Positive Electrode Active Material Layer>

A mixture of 100 parts of lithium cobalt oxide (average particle diameter: 11.5 μm) as a positive electrode active material, 150 parts of sulfide glass composed of $Li_2S$ and $P_2S_5$ ($Li_2S/P_2S_5$=70 mol %/30 mol %; number average particle diameter: 0.4 μm) as solid electrolyte particles, 13 parts of acetylene black as a conductive agent, and 2 parts in terms of solid content of the binder composition was prepared. The mixture was adjusted to a solid content concentration of 78% through addition of xylene as an organic solvent and was then mixed for 60 minutes using a planetary mixer. The solid content concentration was further adjusted to 74% with xylene, and then 10 minutes of mixing was performed to yield a slurry composition for a positive electrode active material layer.

<Production of Slurry Composition for Negative Electrode Active Material Layer>

A mixture of 100 parts of graphite (average particle diameter: 20 μm) as a negative electrode active material, 50 parts of sulfide glass composed of $Li_2S$ and $P_2S_5$ ($Li_2S/P_2S_5$=70 mol %/30 mol %; number average particle diameter: 0.4 μm) as solid electrolyte particles, and 2 parts in terms of solid content of the binder composition was prepared. The mixture was adjusted to a solid content concentration of 60% through addition of xylene as an organic solvent and was then mixed using a planetary mixer to yield a slurry composition for a negative electrode active material layer.

<Production of Slurry Composition for Solid Electrolyte Layer>

A mixture of 100 parts of sulfide glass composed of $Li_2S$ and $P_2S_5$ ($Li_2S/P_2S_5$=70 mol %/30 mol %; number average particle diameter: 1.2 μm; D90 particle diameter: 2.1 μm) as solid electrolyte particles and 2 parts in terms of solid content of the binder composition was prepared. The mixture was adjusted to a solid content concentration of 30% through addition of xylene as an organic solvent and was then mixed using a planetary mixer to yield a slurry composition for a solid electrolyte layer.

<Production of Solid Electrolyte Battery>

The slurry composition for a positive electrode active material layer was applied onto the surface of a current collector and was dried (110° C., 20 minutes) to form a positive electrode active material layer of 50 μm in thickness, and thereby produce a positive electrode. In addition, the slurry composition for a negative electrode active material layer was applied onto the surface of a separate current collector and was dried (110° C., 20 minutes) to form a negative electrode active material layer of 30 μm in thickness, and thereby produce a negative electrode.

Next, the slurry composition for a solid electrolyte layer was applied onto the surface of the positive electrode active material layer and was dried (110° C., 10 minutes) to form a solid electrolyte layer of 18 μm in thickness, and thereby obtain a solid electrolyte layer-equipped positive electrode for a solid electrolyte battery.

The solid electrolyte layer of the solid electrolyte layer-equipped positive electrode for a solid electrolyte battery and the negative electrode active material layer of the negative electrode were laminated, and then pressing was performed to obtain a solid electrolyte battery. The thickness of the solid electrolyte layer in the post-pressing solid electrolyte battery was 11 μm.

Example 2

Production of a binder composition and production of a solid electrolyte battery were carried out in the same way as in Example 1 with the exception that monomer used in production of the shell portion was changed to 38 parts of n-butyl acrylate and 38 parts of ethyl acrylate (hereinafter also referred to as "EA"). The particle diameter of the particulate polymer after production of the shell portion was 220 nm. The polymer forming the shell portion did not include carbon-carbon double bonds and had a glass-transition temperature (Tg) of −33° C.

Example 3

Production of a binder composition and production of a solid electrolyte battery were carried out in the same way as in Example 1 with the exception that monomer used in production of the core portion was changed to 85 parts of 1,3-butadiene and 15 parts of acrylonitrile, and monomer used in production of the shell portion was changed to 50 parts of n-butyl acrylate and 50 parts of ethyl acrylate. The particle diameter of the polymer obtained after production of the core portion was 160 nm and the particle diameter of the particulate polymer after production of the shell portion was 220 nm. The polymer forming the core portion had a glass-transition temperature (Tg) of −52° C. The polymer forming the shell portion did not include carbon-carbon double bonds and had a glass-transition temperature (Tg) of −33° C.

Example 4

Production of a binder composition and production of a solid electrolyte battery were carried out in the same way as in Example 1 with the exception that monomer used in production of the core portion was changed to 80 parts of 1,3-butadiene and 20 parts of styrene, monomer used in production of the shell portion was changed to 180 parts of n-butyl acrylate, and the amount of EGDMA used in production of the shell portion was changed to 1 part. The particle diameter of the polymer obtained after production of the core portion was 140 nm and the particle diameter of the particulate polymer after production of the shell portion was 250 nm. The polymer forming the core portion had a glass-transition temperature (Tg) of −53° C. The polymer forming the shell portion did not include carbon-carbon double bonds and had a glass-transition temperature (Tg) of −40° C.

Comparative Example 1

Production of a binder composition and production of a solid electrolyte battery were carried out in the same way as in Example 1 with the exception that production of the shell portion was omitted in production of the particulate polymer.

Comparative Example 2

Production of a binder composition and production of a solid electrolyte battery were carried out in the same way as in Example 1 with the exception that the amount of EGDMA used in production of the core portion was changed to 0.1 parts, the amount of n-butyl acrylate used in production of the shell portion was changed to 800 parts, and the amount of EGDMA used in production of the shell portion was changed to 0.9 parts. The particle diameter of the polymer obtained after production of the core portion was 180 nm and the particle diameter of the particulate polymer after production of the shell portion was 280 nm. The polymer forming the core portion had a glass-transition temperature (Tg) of −70° C. The polymer forming the shell portion did not include carbon-carbon double bonds and had a glass-transition temperature (Tg) of −40° C.

Comparative Example 3

Production of a binder composition and production of a solid electrolyte battery were carried out in the same way as in Example 1 with the exception that the amount of EGDMA used in production of the core portion was changed to 0.1 parts, the amount of n-butyl acrylate used in production of the shell portion was changed to 10 parts, and the amount of EGDMA used in production of the shell portion was changed to 0.05 parts. The particle diameter of the polymer obtained after production of the core portion was 180 nm and the particle diameter of the particulate polymer after production of the shell portion was 180 nm. The polymer forming the core portion had a glass-transition temperature (Tg) of −70° C. The polymer forming the shell portion did not include carbon-carbon double bonds and had a glass-transition temperature (Tg) of −40° C.

TABLE 1

|  |  |  | Example 1 | Example 2 | Example 3 | Example 4 | Comparative Example 1 | Comparative Example 2 | Comparative Example 3 |
|---|---|---|---|---|---|---|---|---|---|
| Particulate polymer | Core portion | 1,3-Butadiene (parts) | 100 | 100 | 85 | 80 | 100 | 100 | 100 |
|  |  | Acrylonitrile (parts) | — | — | 15 | — | — | — | — |
|  |  | Styrene (parts) | — | — | — | 20 | — | — | — |
|  |  | Crosslinking agent (EGDMA) (parts) | 0.2 | 0.2 | 0.2 | 0.2 | 0.2 | 0.1 | 0.1 |
|  |  | Emulsifier (parts) | 0.5 | 0.5 | 0.5 | 0.5 | 0.5 | 0.5 | 0.5 |
|  |  | Polymerization initiator (parts) | 0.3 | 0.3 | 0.3 | 0.3 | 0.3 | 0.3 | 0.3 |
|  |  | Water (parts) | 150 | 150 | 150 | 150 | 150 | 150 | 150 |
|  |  | Particle diameter (nm) | 180 | 180 | 160 | 140 | 180 | 180 | 180 |
|  |  | Tg (° C.) | −70 | −70 | −52 | −53 | −70 | −70 | −70 |
|  | Shell portion | BA (parts) | 100 | 38 | 50 | 180 | — | 800 | 10 |
|  |  | EA (parts) | — | 38 | 50 | — | — | — | — |
|  |  | Crosslinking agent (EGDMA) (parts) | 0.5 | 0.5 | 0.5 | 1 | — | 0.9 | 0.05 |
|  |  | Emulsifier (parts) | 0.5 | 0.5 | 0.5 | 0.5 | — | 0.5 | 0.5 |
|  |  | Polymerization initiator (parts) | 0.3 | 0.3 | 0.3 | 0.3 | — | 0.3 | 0.3 |
|  |  | Particle diameter (nm) | 210 | 220 | 220 | 250 | — | 280 | 180 |
|  |  | Tg (° C.) | −40 | −33 | −33 | −40 | — | −40 | −40 |
|  | Mass ratio (Core portion/Shell portion) |  | 1/1 | 1/0.76 | 1/1 | 1/1.8 | — | 1/8 | 1/0.1 |
| Evaluations | Coating surface smoothness | Pre-pressing (Ra (μm)) | 3.2 | 3.3 | 4.3 | 2.8 | 3.2 | 3.5 | 3.9 |
|  |  | Post-pressing (Ra (μm)) | 0.8 | 0.2 | 0.2 | 0.4 | 2.2 | 1.5 | 1.8 |
|  |  | Flexibility | Good | Good | Good | Good | Poor | Good | Poor |
|  |  | Resistance (Ω) | 3.7 | 4.1 | 3.8 | 2.9 | 7.9 | 8.7 | 8.2 |
|  |  | Battery capacity (mAh) | 27 | 22 | 20 | 25 | 5 | 8 | 5 |

As can be seen from Table 1, when the used binder composition for a solid electrolyte battery was a binder composition for a solid electrolyte battery containing a particulate polymer having a core-shell structure and an organic solvent, and in which a mass ratio of content of a polymer forming a core portion of the particulate polymer relative to content of a polymer forming a shell portion of the particulate polymer (i.e., a ratio "polymer forming core portion/polymer forming shell portion") was 1/0.3 to 1/5, an obtained layer had good post-pressing coating surface smoothness and flexibility, and low resistance. Moreover, when a solid electrolyte battery was produced and then subjected to five charge/discharge cycles, battery capacity was good.

The invention claimed is:

1. A binder composition for a solid electrolyte battery comprising:
   a particulate polymer having a core-shell structure; and
   an organic solvent, wherein
   a mass ratio of content of a polymer forming a core portion of the particulate polymer relative to content of a polymer forming a shell portion of the particulate polymer is 1/0.3 to 1/5, and
   the polymer forming the core portion is a conjugated diene polymer and a mass ratio of conjugated diene monomer units in the conjugated diene polymer is 70 mass % or more.

2. The binder composition for a solid electrolyte battery according to claim 1, wherein the polymer forming the core portion has a glass-transition temperature of −50° C. or lower and includes a carbon-carbon double bond.

3. The binder composition for a solid electrolyte battery according to claim 1, wherein the polymer forming the shell portion has a carbon-carbon double bond content, calculated in terms of amount of double-bonded carbon, of 20 mass % or less and has a glass-transition temperature of higher than 50° C.

4. The binder composition for a solid electrolyte battery according to claim 1, wherein the organic solvent has a boiling point of 100° C. or higher.

5. The binder composition for a solid electrolyte battery according to claim 1, wherein the conjugated diene monomer units are 1,3-butadiene units.

6. The binder composition for a solid electrolyte battery according to claim 1, wherein the polymer forming the shell portion is an acrylate polymer and a mass ratio of (meth)acrylate monomer units in the acrylate polymer is 50 mass % or more.

* * * * *